US011016829B2

(12) United States Patent
Puttaswamy (10) Patent No.: US 11,016,829 B2
(45) Date of Patent: May 25, 2021

(54) TWO-LAYERED DETERMINISTIC INTERPROCESS COMMUNICATION SCHEDULER FOR INPUT OUTPUT DETERMINISM IN SOLID STATE DRIVES

(71) Applicant: Toshiba Memory Corporation, Tokyo (JP)

(72) Inventor: Ashwini Puttaswamy, Cupertino, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/523,948

(22) Filed: Jul. 26, 2019

(65) Prior Publication Data
US 2021/0026713 A1    Jan. 28, 2021

(51) Int. Cl.
  *G06F 9/54*   (2006.01)
  *G06F 9/48*   (2006.01)
  *G06F 3/06*   (2006.01)

(52) U.S. Cl.
  CPC ............ *G06F 9/544* (2013.01); *G06F 3/0604* (2013.01); *G06F 3/0659* (2013.01); *G06F 3/0673* (2013.01); *G06F 9/4881* (2013.01); *G06F 9/546* (2013.01)

(58) Field of Classification Search
None
See application file for complete search history.

(56) References Cited

U.S. PATENT DOCUMENTS

| 2008/0320274 | A1* | 12/2008 | Singh |
| 2016/0342365 | A1* | 3/2016 | Nosaka |
| 2017/0075622 | A1* | 3/2017 | Kwon |
| 2019/0042150 | A1 | 2/2019 | Wells et al. |

OTHER PUBLICATIONS

Carlson, Mark, "Achieving Predictable Latency for Solid State Drives," Storage Developer Conference EMEA, pp. 1-32, 2018.
International Search Report on PCT PCT/IB2020/056931 dated Sep. 24, 2020.

* cited by examiner

*Primary Examiner* — Syed A Roni
(74) *Attorney, Agent, or Firm* — Foley & Lardner LLP (57) ABSTRACT

Systems and methods for two-layered or a two-phase deterministic inter-process communication (IPC) scheduling for input output deterministic (IOD) sets also referred to as non-volatile memory (NVM) sets in a solid state drive (SSD) system are provided. In various embodiments, an SSD controller includes an IPC scheduler comprising a first layer NVM set scheduler and a second layer fair share scheduler, configured to receive information messages for NVM sets, operable to prioritize the information messages in IPC queues, and generate an IPC pipeline to be processed for I/O operations.

20 Claims, 7 Drawing Sheets

TWO-LAYERED DETERMINISTIC INTERPROCESS COMMUNICATION SCHEDULER FOR INPUT OUTPUT DETERMINISM IN SOLID STATE DRIVES

TECHNICAL FIELD

The present embodiments relate generally to the field of solid state drives (SSD), more specifically to systems and methods for scheduling inter process communications for low latency operations.

BACKGROUND

A solid state drive (SSD) includes a number of non-volatile memory devices such as but not limited to, NAND flash memory devices controlled by a controller such that the NAND flash memory devices behave like a single drive. The NAND flash memory devices are subject to host originated input output (I/O) operations such as reading and writing data stored in the NAND flash memory devices, which may originate from multiple disparate applications running on one or more hosts. A NAND flash memory device may only be processing a single I/O operations at any one time and a memory bus/channel connecting multiple NAND flash devices to a memory controller may only be transferring data for a single memory device at any one time. Traditionally, a host application attempting to read data from or write data to an SSD therefore typically experiences varying levels of latencies due to having to share access to the memory devices with other applications. Furthermore, because the I/O activities of different applications are typically not synchronized or related, the latencies as experienced by a single application are unpredictable. In an example in which a host resides within a datacenter having a large number of SSDs and hosts running multiple disparate applications to store and retrieve data, the host has no control over the unpredictable latencies of the SSDs when requesting the SSDs to perform I/O operations for an application due to the simultaneous and unconnected activities of other hosts and applications. The host experience can further deteriorate in the scenario where the host is running time-sensitive applications (e.g., real-time data gathering, real-time data distribution, and so on) on the SSDs.

In an attempt to limit the effect of one application having a deleterious effect of the I/O latencies experienced by another, the NVM Express™ v1.4 base protocol specification for non-volatile memory storage introduced the concept of a "non-volatile (NVM) set" where the non-volatile storage was divided into separately addressable regions. These regions were logically and/or physically separate areas of memory, which enabled separate host applications to exclusively access separate areas of memory without having to share memory resources with each other. However, there remains the need for a NAND flash memory controller in an SSD to have the capability to handle the I/O from multiple disparate host applications to multiple NVM sets with deterministic and predictable I/O latencies (also referred to as I/O Determinism, IOD) for the host applications and improving the experience of the host applications with respect to I/O operations on the SSD.

SUMMARY

Systems and methods for a two-layered or a two-phase deterministic inter-process communication (IPC) scheduler for an SSD system are provided. In various embodiments, an SSD controller includes an IPC scheduler comprising an input output deterministic (IOD) set scheduler, also referred to as NVM set scheduler and a fair share scheduler, configured to prioritize IPC messages for each of a plurality of NVM sets to form an IPC pipeline to be processed for I/O operations. In the first phase, the IPC scheduler is configured to order the IPC queues for each NVM set of a plurality of NVM sets, from the highest to the lowest priority to form ordered IPC queues for each NVM set. In the second phase, the IPC scheduler selects an IPC message from the ordered IPC queues for each NVM set in a round robin fashion to form an IPC pipeline, such that a single IPC message is selected from each NVM set in a single round. The IPC messages selected as such may be put into an IPC pipeline to be processed for I/O operations. The IPC pipeline formed as such decreases latency in I/O operations.

The IPC scheduler or scheduling scheme as mentioned above can ensure a fair share of resources among a plurality of NVM sets while managing the IPC queues associated with each NVM set to provide a deterministic and low latency throughput for each NVM set. This helps reduce noisy neighbor effects such that I/O workload associated with one NVM set does not affect operations for another NVM set.

The IPC scheduler as such may help manage the controller, memory and HW resources in an SSD system in a fair manner. Without the solution of the present embodiments, the controller would distribute its resources unevenly among the multiple NVM sets based on the I/O workload, leading to I/O latencies.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As explained earlier, when it comes to solid state drive (SSD) architecture and related firmware, some crucial considerations are bandwidth and I/O latency (i.e., the amount of time it takes to complete an I/O operation). An SSD typically comprises a number of non-volatile memory dies, such as NAND flash memory, that are arranged in groups coupled to channels that are controlled by a channel controller.

A controller in an SSD system typically has to perform a large number of I/O operations (read and write) as well as a large number of maintenance operations such as garbage collection, erase invalid data, and data reliability operations. However, maintenance operations may take place in the background at any time and compete with resources within the controller and access to the NAND flash memory with host-originated I/O operations, causing host-originated I/O operations to become highly non-deterministic as they may take an indeterminate amount of time to complete, due to interference from maintenance operations. In the absence of maintenance operations, host I/O can/will still be non-deterministic due to self-interference (e.g. noisy neighbor type applications accessing the same SSD). Equally, I/O operations originating from different hosts or applications directed to the same SSD may cause interference to each other, giving rise to the so-called "noisy neighbor" effect.

Some existing solutions for achieving a more consistent bandwidth and I/O latency include operating the SSD controller in a deterministic mode to perform the operations that require deterministic bandwidth and latency and in a non-deterministic mode to perform operations that do not have such a requirement. While operating, the controller typically exchanges information or messages (data and instructions) between memory dies and a host interface. For this purpose, a conventional controller typically includes a generic scheduler that broadly categorizes such messages based on their priority, rather than based on any particular mode, deterministic or non-deterministic, which can severely limit its ability to offer the consistent bandwidth and I/O latency required for a deterministic mode.

The present disclosure relates to a two-layered deterministic IPC scheduler for a plurality of NVM sets in an SSD drive. Throughout this specification, an NVM set may also be referred to as an NVM set or a non-volatile memory (NVM) set. Aspects of NVM have been described in the U.S. patent application Ser. No. 15/800,742 entitled "SSD ARCHITECTURE SUPPORTING LOW LATENCY OPERATION," the contents of which are incorporated herein by reference in their entirety.

According to certain aspects, the present applicant recognizes that existing SSD controllers typically implement a generic scheduler for IPC messages to be processed (e.g. associated with read/write operations). For NVM drives, the generic scheduler broadly separates the IPC queues for an NVM set or multiple NVM sets into higher priority queues and lower priority queues and then sequentially processes all the IPC queues in the order of their priority from highest to lowest.

The higher priority message for an NVM set may need to wait for completion of higher priority IPCs on previous set, leading to an overall increase in I/O latency of some sets and decrease the performance and predictability. This is not suitable for NVM drives as it introduces latency in IPC processing depending on traffic on neighboring IPCs of another set. In other words, in the conventional systems, the SSD controller distributes its resources unevenly among the multiple NVM sets based on the I/O workload leading to I/O latencies.

To address these and other issues, a controller according to embodiments implements a two-layered or two-phase IPC deterministic scheduler that fairly distributes priority among all the IPC queues and NVM sets. As will be explained, the disclosed embodiments may enable a controller in an SSD system to distribute its resources evenly among the multiple NVM sets based on the I/O workload, thereby reducing I/O latencies.

Figure 1:
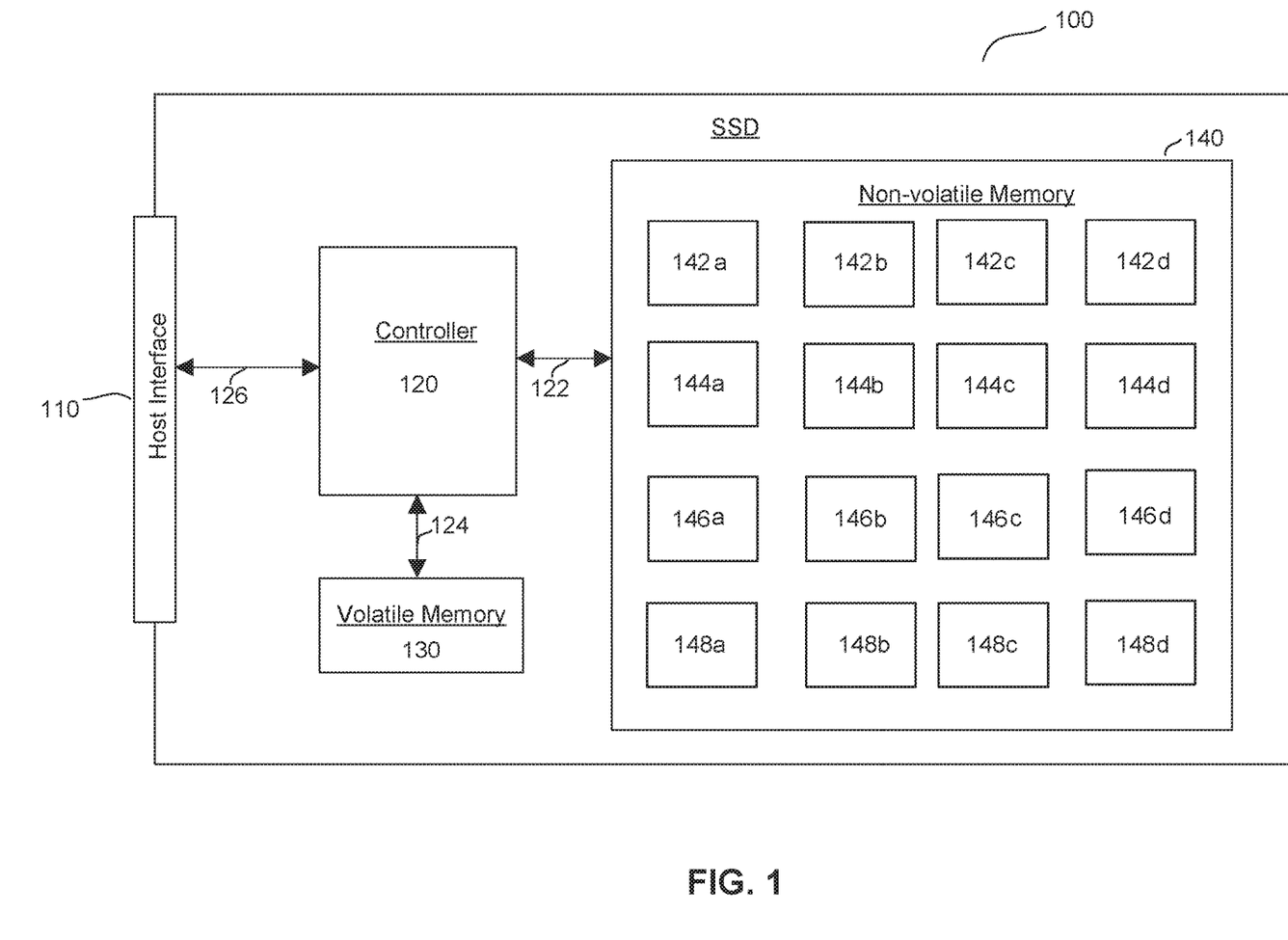
FIG. 1 is a block diagram illustrating the structure of an SSD according to an example.

FIG. 1 is a block diagram of an example structure of an SSD 100, according to one embodiment. As shown in FIG. 1, an SSD memory controller 120 is in communication with one or more host devices or host applications (not shown) through a host interface 110. The host device may comprise any suitable device, such as a computer (e.g. compute node) or storage appliance. The SSD 100 includes both a volatile memory 130, and an array of non-volatile memory dies 140. The volatile memory device 130 and the array of non-volatile memory dies 140 are in communication with the SSD memory controller 120 via the buses 124 and 122, respectively. The array of memory dies 140 is configured to communicate with controller 120 via a bus or a link 122, which may consist of one or more physical memory channels. The controller 120 is configured to communicate with host interface 110 via a bus or a link 126.

The array of non-volatile memory dies 140 comprises non-volatile memory dies 142*a-d*, 144*a-d*, 146*a-d*, and 148*a-d* that may be arranged in one or more channels to communicate with controller 120 via the link 122.

While 16 non-volatile memory dies 142*a-d*, 144*a-d*, 146*a-d*, and 148*a-d* are shown in FIG. 1, the array of non-volatile memory dies 140 of the SSD 100 may comprise any suitable number of non-volatile memory dies 140 that are arranged in one or more channels in communication via 122 with the SSD memory controller 120.

In one embodiment, the volatile memory device 130 comprises a volatile memory DRAM buffer or cache. The volatile memory device 130 need not be a single device of a unitary type, and may comprise multiple devices of different types capable of providing a volatile memory buffer for the SSD 100. In one embodiment, the non-volatile memory dies 142*a-d*, 144*a-d*, 146*a-d*, and 148*a-d* comprise NAND flash memory.

Figure 2:
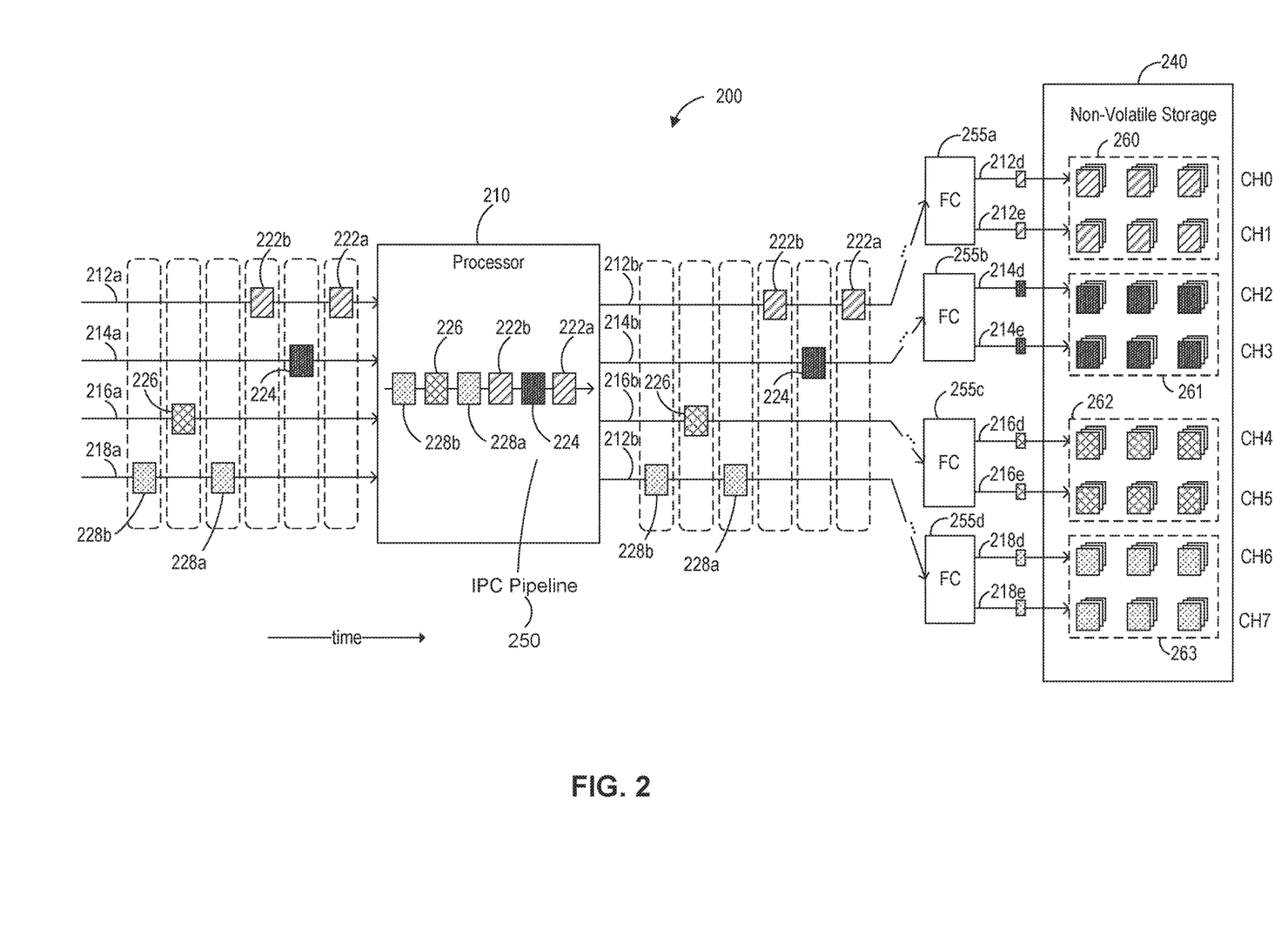
FIG. 2 is a block diagram illustrating communications within a controller using IPC queues, according to some implementations.

FIG. 2 is a block diagram illustrating example communications within the controller 200 using IPCs, according to some implementations. The controller 200 can be an example implementation of the controller 120 in FIG. 1. The non-volatile storage 240 can be a non-volatile memory such as but not limited to, the non-volatile memory 140.

The non-volatile storage 240 includes an array of non-volatile memory dies that are arranged across 8 channels (e.g., CH0-CH7), with three non-volatile memory dies coupled to each channel. In other words, the non-volatile storage 240 includes an array of NAND flash memory devices. The channel connections to the individual dies are not shown for the sake of clarity. Each of the non-volatile memory dies has multiple planes. One of ordinary skill in the art can appreciate that any suitable number of dies can be operatively coupled to any suitable number of channels. The channels CH0-CH7 can be a physical channel or a logical channel.

The non-volatile memory dies of the non-volatile storage 240 form isolation regions (physically isolated regions) or NVM sets 260-263. The dies that belong to a same NVM set are denoted by the same shading. For example, the dies operatively coupled to the channels CH0 and CH1 form an NVM set 260. The dies operatively coupled to the channels CH2 and CH3 form an NVM set 261. The dies operatively coupled to the channels CH4 and CH5 form an NVM set 262. The dies operatively coupled to the channels CH6 and CH7 form an NVM set 263.

The controller 200 may include one or more processors configured to perform various processes of the controller 200. For example, a processor 210 can be any suitable processor or process of the controller 200. The firmware of the controller 200 can configure any suitable number of sets from the dies in the non-volatile storage 240 and can configure a same number of independent data lanes. In other words, the firmware of the controller 200 can configure an independent data lane for each configured set, as described in more detail in U.S. application Ser. No. [117441-0126], the contents of which are incorporated herein by reference in their entirety.

The controller 200 further includes flash controllers (FCs) 255a-255d in some implementations. The FCs 255a-255d take the memory commands from the flash interface layer (not shown) and schedule the commands on the individual memory channels, performing the necessary memory bus control signaling and data transfers to the memory dies and checking the memory die status for the success or failure of the commands. As shown, each of the NVM sets 260-263 has one different one of the FCs 255a-255d. For instance, the FC 255a is in the I/O path of the NVM set 260. The FC 255b is in the I/O path of the NVM set 261. The FC 255c is in the I/O path of the NVM set 262. The FC 255d is in the I/O path of the NVM set 263.

As shown, independent data lanes are provided along the I/O paths for the NVM sets 260, 261, 262 and 263. A first independent data lane includes IPCs or IPC queues 212a, 212b, and one or more other IPCs not shown. Two IPCs 212d and 212e linking the flash controller (FC) 255a to the NVM set 260 are provided given that the links between the FC 255a to the NVM set 260 are channel-specific. The first independent data lane carries the messages for only the NVM set 260 and not another set.

A second independent data lane is provided along the I/O path for the NVM set 261. The second independent data lane includes IPCs or IPC queues 214a, 214b, and one or more other IPCs not shown. Two IPCs 214d and 214e linking the FC 255b to the NVM set 261 are provided given that the links between the FC 255b to the NVM set 261 are channel-specific. The second independent data lane carries the messages for only the NVM set 261 and not another set.

A third independent data lane is provided along the I/O path for the NVM set 262. The third independent data lane includes IPCs or e.g. IPC queues 216a, 216b, and one or more other IPCs not shown. Two IPCs 216d and 216e linking the FC 255c to the NVM set 262 are provided given that the links between the FC 255c to the NVM set 262 are channel-specific. The third independent data lane carries the messages for only the NVM set 262 and not another set.

A fourth independent data lane is provided along the I/O path for the NVM set 263. The fourth independent data lane includes IPCs or e.g. IPC queues 218a, 218b, and one or more other IPCs not shown. Two IPCs 218d and 218e linking the FC 255d to the NVM set 263 are provided given that the links between the FC 255d to the NVM set 263 are channel-specific. The fourth independent data lane carries the messages for only the NVM set 263 and not another set.

Each independent data lane carries the instructions, messages, and tasks for only for a particular NVM set and not another set. Moreover, each independent lane may comprise one IPC, one IPC queue or a plurality of IPC queues. In other words, the example illustration of data lanes shown in FIG. 2 should not be considered limiting.

The boxes shown along or in the IPC queues 212a-212b, 214a-214b, 216a-216b, and 218a-218b refer to IPC messages (e.g., instructions, tasks, and so on) carried in corresponding ones of the IPC queues 212a-212b, 214a-214b, 216a-216b, and 218a-218b. The boxes having the same shading as that of a corresponding one of the NVM sets 260-263 refer to messages related to the corresponding set and not another set.

In one example, IPC messages 222a and 222b for the NVM set 260 are received by the processor 210 via the IPC queue 212a. An IPC message 224 for the NVM set 261 is received by the processor 210 via the IPC queue 214a. An IPC message 226 for the NVM set 262 is received by the processor 210 via the IPC queue 216a. IPC messages 228a and 228b for the NVM set 263 are received by the processor 210 via the IPC queue 218a.

In some embodiments, an IPC message may be prepared as an optimal transfer and processing unit (OTPU). Each IPC message may be communicated in an OTPU over the independent data lanes.

For example, messages for the NVM set 260 are prepared as OTPUs 222a and 222b and received by the processor 210 via the IPC queue 212a. A message for the NVM set 261 is prepared as an OTPU 224 and received by the processor 210 via the IPC queue 214a. A message for the NVM set 262 is prepared as an OTPU 226 and received by the processor 210 via the IPC 216a. Messages for the NVM set 263 are prepared as OTPUs 228a and 228b and received by the processor 210 via the IPC 218a.

In some examples, the IPC messages can be parts of I/O operations (e.g., read and write), background operations, start/stop I/O, and so on. Additionally, in other examples, controller 200 can include a plurality of processors in addition to processor 210 dedicated to handle IPC messages for different processes In one example, the IPC messages are of the same size which can be determined by the firmware of the controller 200. More details about an example method of sizing of messages for communication over independent lanes are described in the U.S. patent application Ser. No. 16/523,922 filed Jul. 26, 2019 entitled "TRANSFER AND PROCESS- ING UNIT FOR NVMSSD", the contents of which are incorporated by reference herein in their entirety.

In conventional systems, the controller's firmware may implement a generic scheduler for forming an IPC processing pipeline 250 inside the processor 210. As can be seen, the IPC pipeline 250 includes messages from various sets. When processor 210 includes a generic scheduler, the messages in pipeline 250 are arranged in an order with no fair share given to any IPC queue or set.

Figure 3:
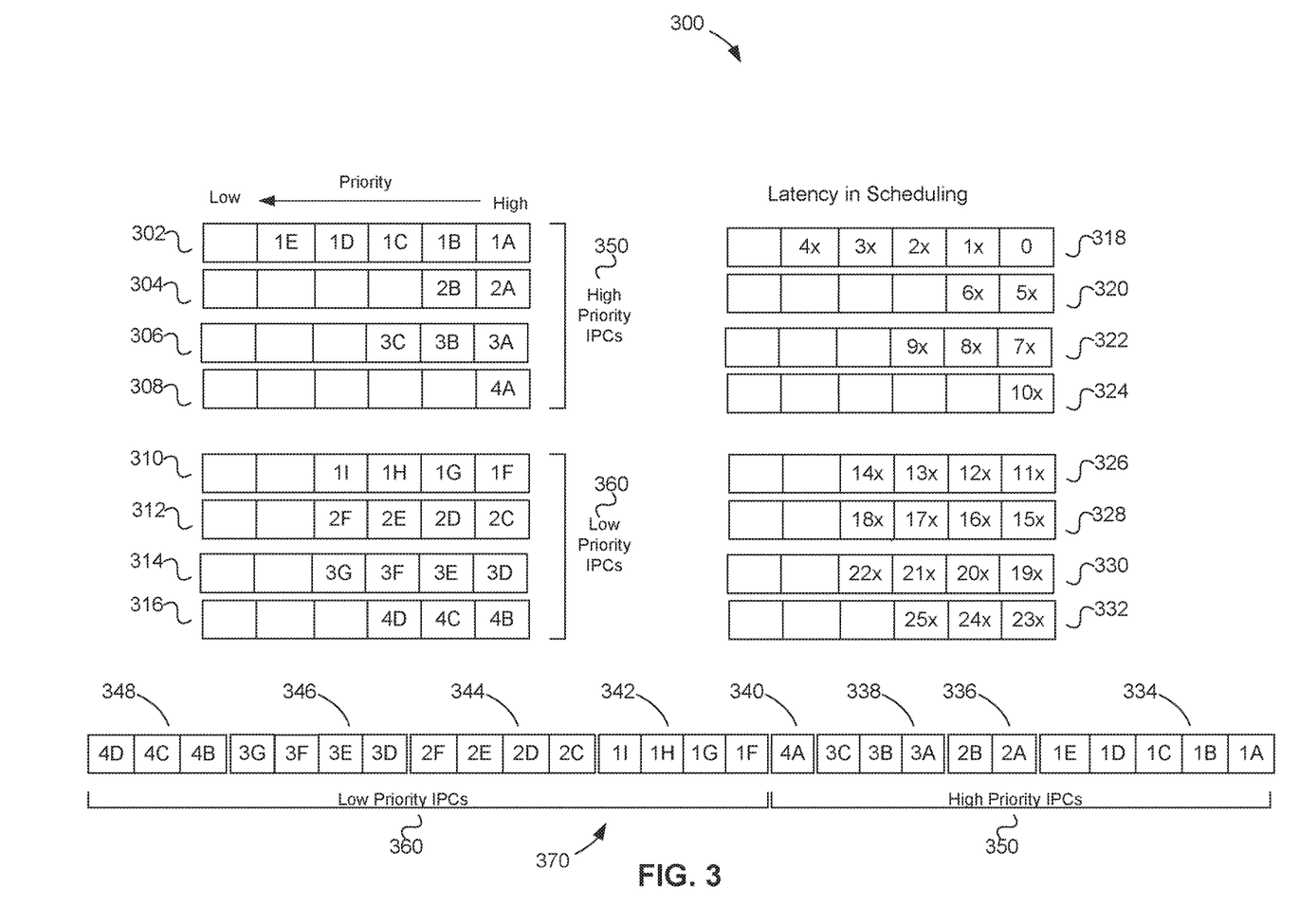
FIG. 3 is a block diagram illustrating an example generic IPC scheduler.

For example, FIG. 3 is a block diagram illustrating aspects of a generic IPC scheduler process 300. In the example of FIG. 3, elements 302-308 are high priority IPCs or IPC queues for four different NVM sets, and elements 310-316 are low priority IPCs or IPC queues for the same four different NVM sets. It should be noted, however, that data lanes for NVM sets can comprise any suitable number of IPCs or IPC queues with any suitable number of priority levels.

The generic scheduler broadly separates the IPCs or the IPC queues for all of the NVM sets into high priority IPC queues 350 including IPC 302 (comprising IPC messages 1A, 1B, 1C, 1D, 1E), 304 (2A, 2B), 306 (3A, 3B, 3C) and 308 (4A) and low priority IPC queues 360 including IPC 310 (comprising IPC messages 1F, 1G, 1H, 1I), 312 (2C, 2D, 2E, 2F), 314 (3D, 3E, 3F, 3G) and 316 (4B, 4C, 4D). The generic scheduler process then puts the information from all the IPC queues, from highest priority to lowest priority, in a sequential manner into an IPC pipeline 370. In one example, the priority of messages within each IPC queue decreases from right to left in FIG. 3. In other words, the priority of the rightmost message has the highest priority and the leftmost message has the lowest priority. Thus 1A, 2A, 3A, and 4A are the highest priority messages in the high priority IPC queues 350. Similarly, 1F, 2C, 3D, and 4B are the highest priority messages in the low priority IPC queues 360. The IPC pipeline 370 generated by the generic scheduler comprises blocks 334 (comprising messages 1A, 1B, 1C, 1D, 1E from IPC 302), 336 (2A, 2B), 338 (3A, 3B, 3C), 340 (4A), 342 (1F, 1G, 1H, 1I), 344 (2D, 2E, 2F), 346 (3D, 3E, 3F, 3G), and 348 (4B, 4C, 4D) in a sequential order. As can be seen, as a consequence of the operation of the generic scheduler process 300, the highest priority message 4A of the IPC queue 308 is in the 11$^{th}$ place in the IPC pipeline 370. If "t" is the time required to process each message, then 4A has to wait for a duration of '10t' in order to be processed even though it is the highest priority message for the NVM set associated with IPC 308. In other words, the latency associated with 4A is '10t'. Similarly, the latency associated with the message 2A is '5t'.

Accordingly, although the generic scheduler is priority based, it does not prevent one NVM set affecting latencies on other sets. This type of scheduling scheme conflicts with the objectives of I/O determinism and thus is not suitable for firmware in NVM drives.

Figure 4:
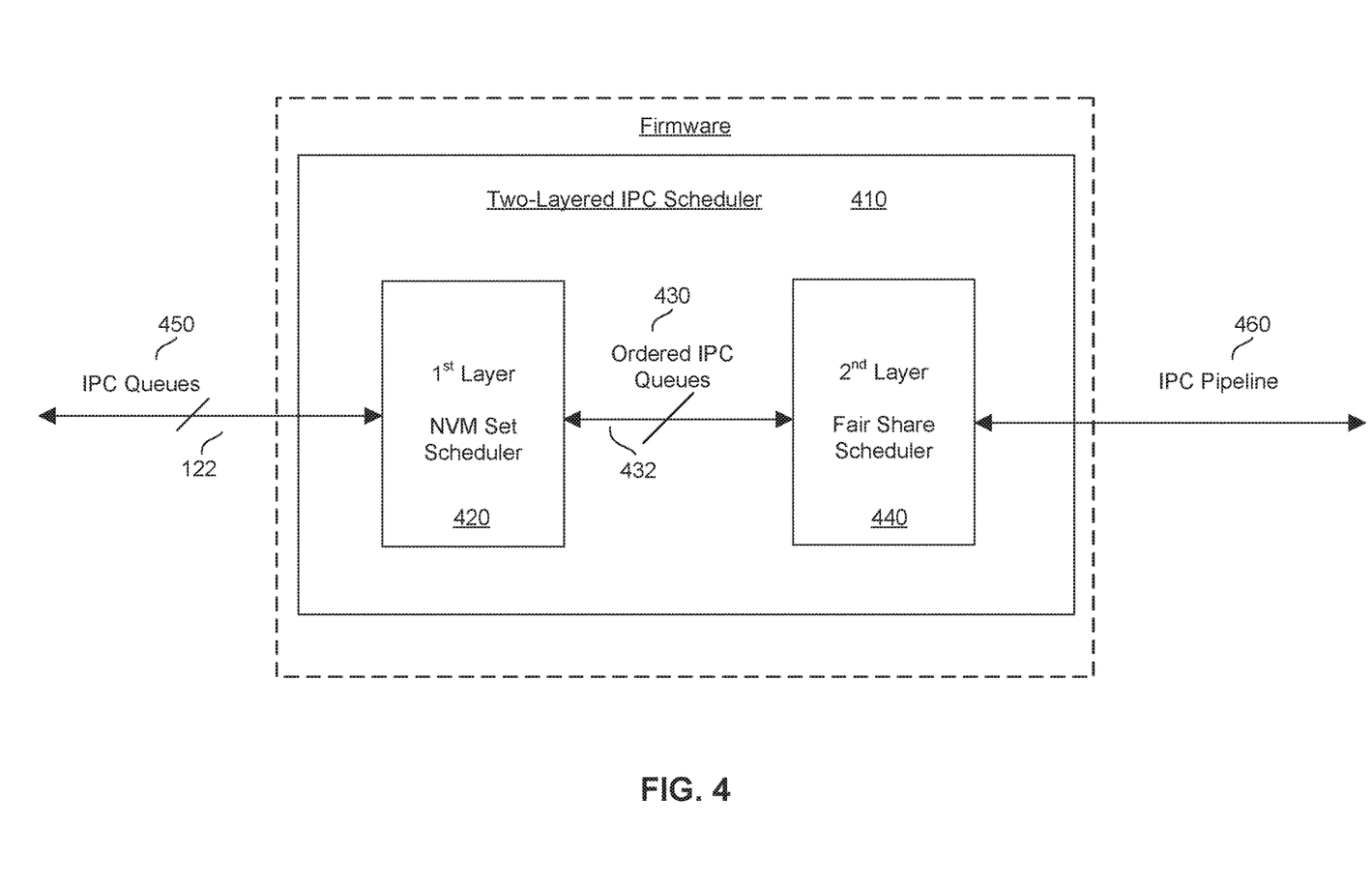
FIG. 4 is a block diagram of an SSD controller comprising a two-layered IPC scheduler, according to an example embodiment.

FIG. 4 is a block diagram a two-layered IPC scheduler 410, hereafter scheduler 410, according to an example embodiment. In the example indicated by FIG. 4, the scheduler 410 is implemented as part of the controller's firmware. In other embodiments the scheduler may be implemented in hardware as well. In these and other embodiments, scheduler 410 may be implemented as part of the firmware or software that implements any or all of the processors or processes in a controller, such as processor 210 described in connection with FIG. 2.

As shown in the example of FIG. 4, scheduler 410 comprises an NVM set scheduler 420 and a fair share scheduler 440. The NVM set scheduler 420 is configured to receive messages from the IPC queues 450 associated with NVM sets in the memory device 140. In one example, the IPC queues 450 may be unordered. In other words, the messages in the IPC queues 450 may have a mixed priority. The scheduler 420 is further configured to generate ordered IPC queues 430. The fair scheduler 440 is configured to receive the ordered NVM queues 430 via the communication link 432 and further configured to generate the IPC pipeline 460 containing ordered IPC messages. A method of generating the ordered IPC queues and the IPC pipeline according an example embodiment will be discussed in more detail below.

Figure 5:
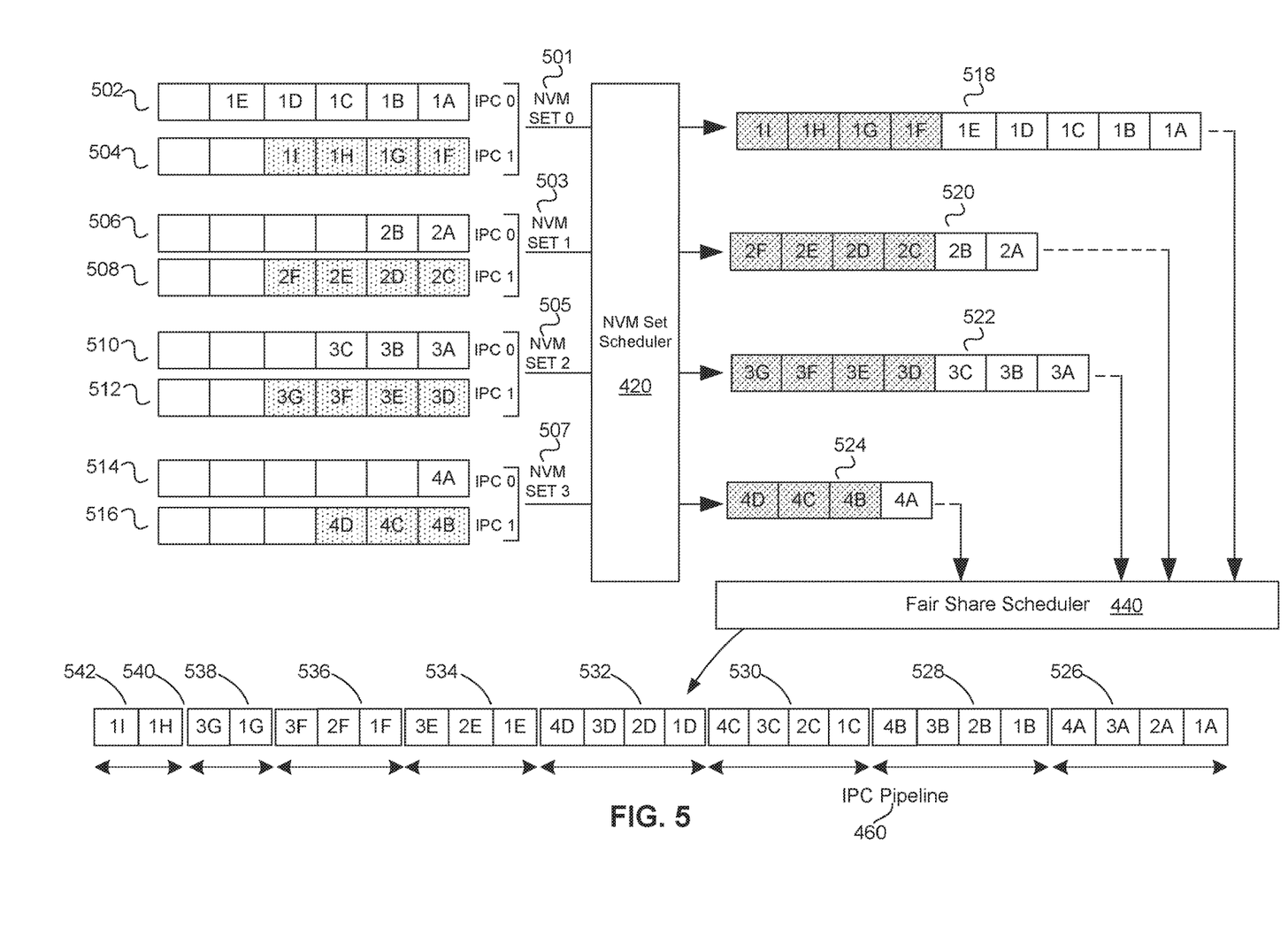
FIG. 5 is a first example of ordered NVM sets and an IPC pipeline formed by the two-layered IPC scheduler, according to an example embodiment.

FIG. 5 illustrates an example of ordered IPC queues and an IPC pipeline formed by the two-layered IPC scheduler 410, according to an example embodiment. As shown, the NVM set scheduler 420 is configured to receive IPC messages for NVM set 0 (501), NVM set 1 (503), NVM set 2 (505), and NVM set 3 (507). The IPC messages for each NVM set are further received by NVM set scheduler 420 via IPC0 and IPC1 queues. Accordingly, as shown, the messages for NVM sets 501, 503, 505, and 507 are received via IPC queues 502 & 504, 506 & 508, 510 & 512, 514 & 516 respectively. For NVM set 0, the IPC queue 502 comprising messages 1A, 1B, 1C, 1D, and 1E has a higher priority than queue 504 comprising messages 1F, 1G, 1H, and 1I. For NVM set 1, the queue 506 comprising the messages 2A, 2B has a higher priority than queue 508 comprising messages 2C, 2D, 2E, and 2F. For NVM set 2, the queue 510 comprising messages 3A, 3B, 3C has a higher priority than the queue 512 comprising messages 3D, 3E, 3F, and 3G. For NVM set 3, the queue 514 comprising message 4A has a higher priority than 516 comprising messages 4B, 4C, and 4D.

The NVM set scheduler 420 is configured to generate the ordered IPC queues 518, 520, 522, and 524 from the unordered IPC queues for NVM sets 501, 503, 505, and 507 respectively. As can be seen the ordered IPC queues have messages placed in their order of priority with the highest priority message(s) being in the rightmost place in each ordered queue in this example.

The fair share scheduler 440 is configured to receive the ordered IPC queues 518, 520, 522, 524 and to generate the IPC pipeline 460. As can be seen the IPC pipeline 460 comprises messages associated with the queues for all of the NVM sets arranged in a fair manner in the order of their priority. For example a block 526 in the IPC pipeline comprises the highest priority messages 1A, 2A, 3A, and 4A from the NVM sets 501, 503, 505, and 507 respectively. Similarly the blocks 528, 530, 532, 534, 536, 538, 540, and 542 comprise messages from the NVM sets 0-3 in the order of their priority. As such, the latency in processing the messages is reduced. For example, the message 4A which had a 10t latency when arranged by the generic scheduler 300 now has a latency of only 3t. As such in one example, the two-layered scheduler 410 of the present embodiments may reduce the overall latency of generic scheduling approaches by a substantial amount.

In one embodiment, the fair share scheduler 440 assigns a fair priority to the messages for all of the NVM sets by implementing a round robin algorithm. In other embodiments, the fair share priority may be assigned by using other methods.

Figure 6:
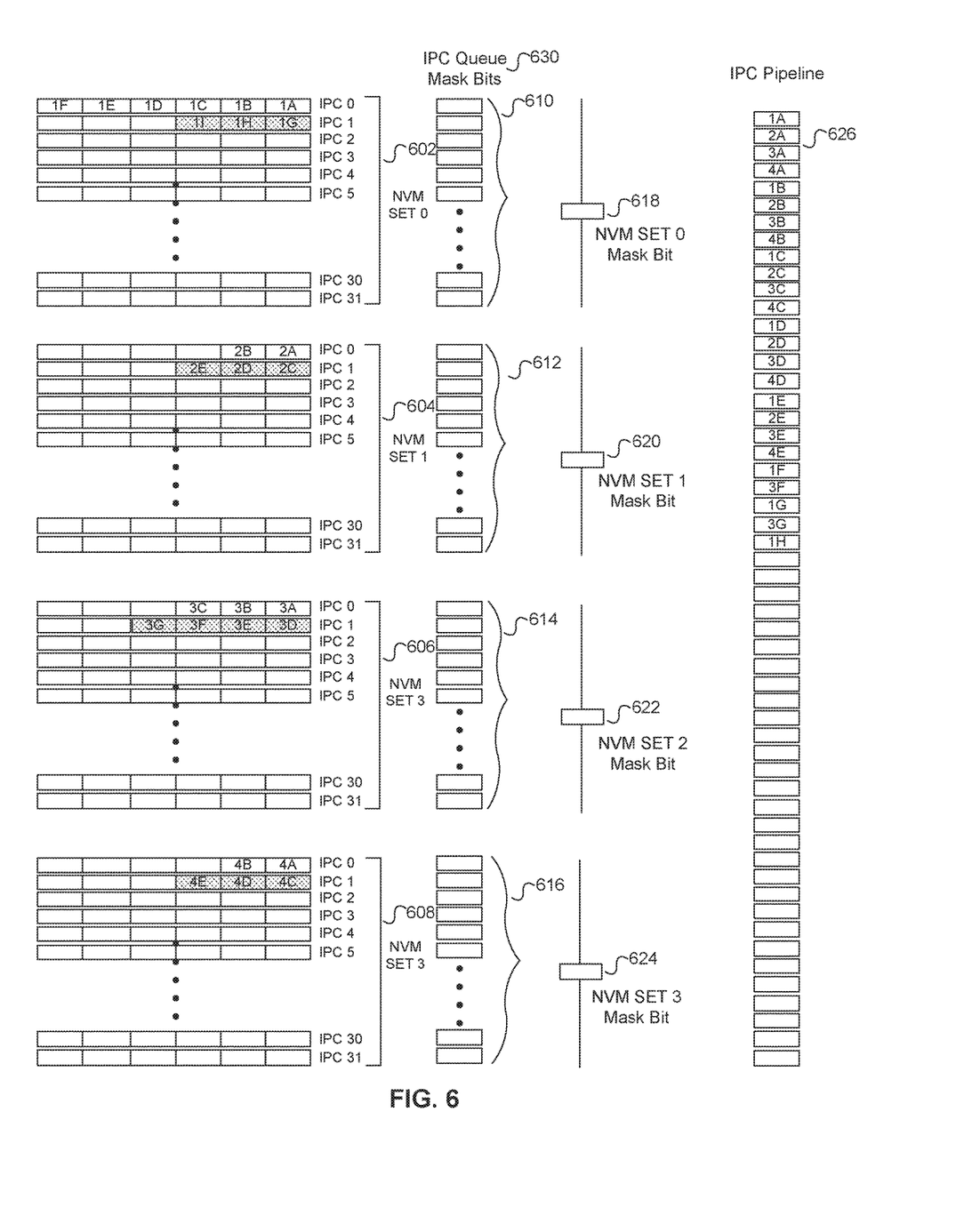
FIG. 6 is a second example illustrating an IPC pipeline formed by the two-layered IPC scheduler, according to an example embodiment.

FIG. 6 illustrates example aspects of forming an IPC pipeline by two-layered IPC scheduler 410 in additional or alternative detail. As shown there are unordered messages for NVM sets 602, 604, 606, and 608 in this example, the messages being received in IPC queues 0-31 for each NVM set. There are also IPC queue mask bits associated each IPC queue, collectively shown as 610, 612, 614 and 616 for sets 0, 1, 2, 3, respectively. These bits are set (made equal to logic high) or reset (made equal to logic low) as described below. Further, there may be an NVM set mask bit 618, 620, 622, 624 for each NVM set 0, 1, 2, 3, respectively, which may be set (made equal to logic high) or reset (made equal to logic low) as likewise described below.

In one possible embodiment, the firmware may selectively set or reset particular IPC queue mask bits for those IPC queues which need to be processed by two-layered IP scheduler 410. For example, if a message is received on an IPC queue 0 for NVM set 1 602, then the firmware of processor 210 may set a corresponding bit in bit mask 612. Further, in this and other examples, if any of the IPC queue mask bits for a given NVM set (i.e. any of bits 610 for NVM set 0, any of bits 612 for NVM set 1, any of bits 614 for NVM set 2, and any of bits 616 for NVM set 3) are made equal to logic high, then the corresponding NVM set mask bit (618-624) is also made equal to logic high. This may be used as an indication to two-layer scheduler 410 about which queues and sets contain messages to be arranged in the IPC 626 pipeline.

As described above, the selected messages, as indicated in the queues IPC 0-31 for the NVM sets 602, 604, 606, and 608, are processed into ordered IPC queues by IPC scheduler 410 (not shown in FIG. 6), and IPC scheduler 410 may use the bits in bit masks 610, 612, 614 and 616 to identify which of queues IPC 0-31 in each set contain messages which need to be ordered. Thereafter, set scheduler 420 (not shown in FIG. 6) arranges the messages in the ordered queues into the IPC pipeline 626 in the order of their priorities, with each NVM set receiving a fair share in scheduling. During this processing, set scheduler 420 may use the bits in group masks 618, 620, 622 and 624 to determine which sets have ordered IPC queues for processing. In these and other embodiments, after performing processing as described in more detail above, IPC scheduler 410 may reset (e.g. made equal to logic low) all the bits in IPC masks 610, 612, 614 and 616, as well as all the bits in group masks 618, 620, 622 and 624. The above mentioned configuration may be extended for any number of IPC queues and NVM sets.

Figure 7:
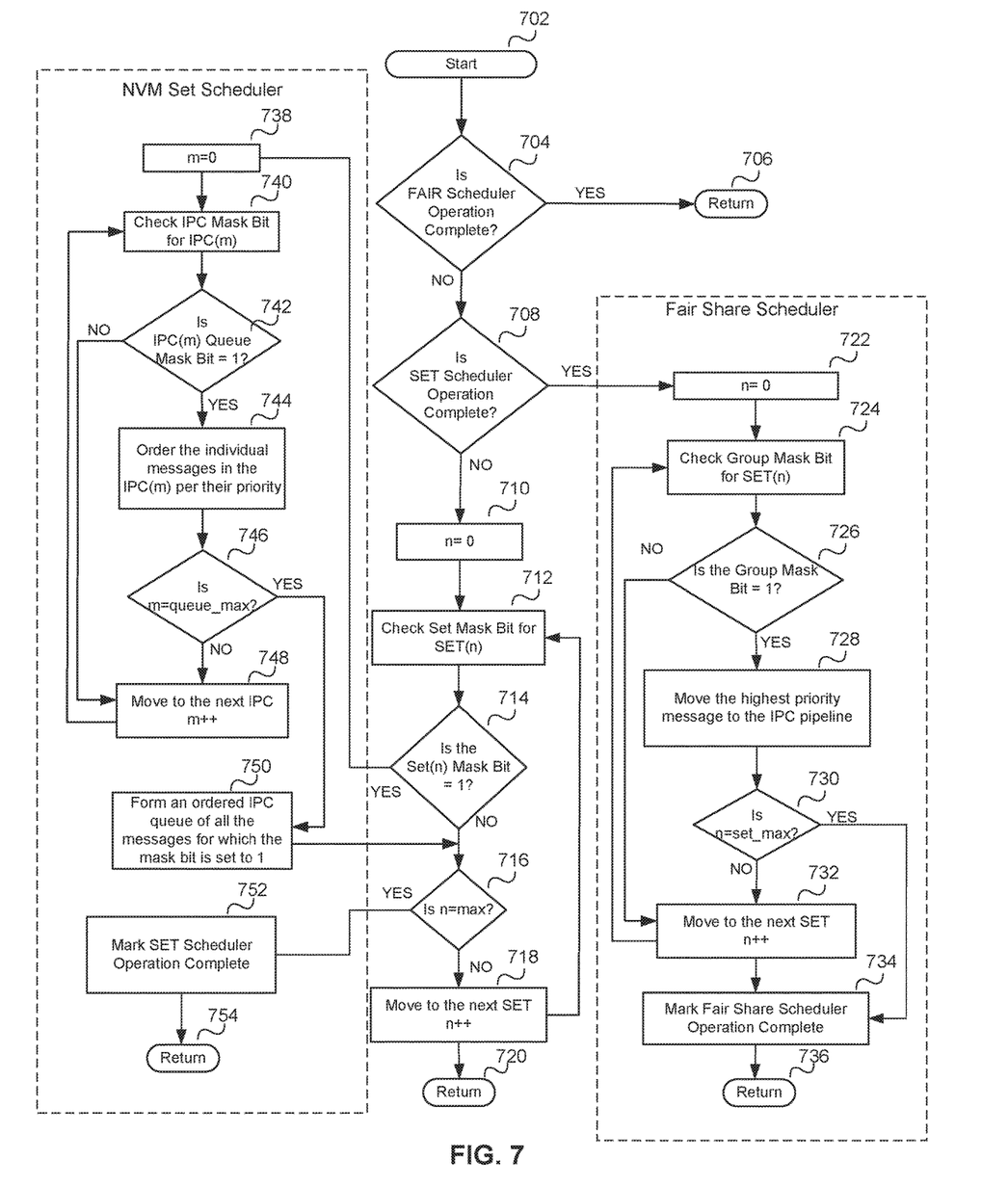
FIG. 7 is a flow diagram of a method of forming the IPC pipeline of FIG. 5 using the two-layered IPC scheduler, according to an embodiment.

FIG. 7 is a flow diagram of a method of performing two-layered IPC scheduling for IOD, according to an embodiment.

As illustrated, the process starts at block 702.

At 704 it may be checked if the fair share operation is complete. For example, this operation may include determining if all of the NVM set group mask bits (e.g. 618-624 in FIG. 6) have been reset (e.g. made equal to logic low). If so, then the process moves to a block 706 from where it may return to start. If not, then the process moves to a block 708.

At 708 it may be checked if the NVM set scheduler operation is complete. For example, this operation may include determining if all of the IPC bit masks (e.g. 610-616) have been reset (e.g. made equal to logic low). If so, then the process moves to a block 722 from where it may enter a fair share scheduler mode. If not, then the process moves to a block 710.

It may be assumed that there is a predefined number 'max' of NVM sets and a variable 'n' represents a particular set number.

At 710, the value of "n" may be made equal to zero.

At 712 and 714 it may be checked if the NVM set mask bit for the first set (when n=0) is high. If so, then the process move to block 738, where the process enters an IPC set scheduler mode. If not, then the process moves to block 716.

It may be assumed that there are "m" IPC queues in each NVM set. At 738, the value of "m" may be made equal to zero.

At 740 and 742, it may be checked if the IPC queue mask bit (when m=0) is high. If so, then the process moves to block 744. If not, then the process moves to 748.

At 744, the individual messages in the IPC(m) may be arranged in the order of their priority, after which the process moves to the block 746.

At 746, it may checked is the value of "m" has reached a predefined maximum value queue_max. If so, then the process moves to the block 750. If not, then the process moves to the block 748.

At 748, the value of "m" may be incremented by 1 after which the process moves back to the block 740. As such, the individual IPC messages in each IPC queue for the set(n) are ordered according to their priority.

At 750, an ordered IPC queue for all the messages for which the queue mask bit is high, may be formed. After this, the process moves to the beginning of block 716.

At 716, it may be checked if the value of "n" has reached a maximum predefined value set_max. If so, then the process moves to the block 752. If not, then the process moves to the block 718.

At 718, the value of "n" may be incremented by 1 after which the process moves back to the block 712. As such, the ordering of all the IPC queues is performed for all the NVM sets.

At 752, the NVM set scheduler operation may me marked as complete. This may include resetting all of the IPC bit masks to logic low.

From the block 752, the process further moves to the return block 754.

After returning from block 754, and after evaluating blocks 704 and 708, the process may move to block 722, the fair share scheduler mode.

At 722, the value of "n" may again be made equal to zero after which the process moves to the block 724 and then to 726.

At 726, it may be checked if the group mask bit for the set(n) is high. If so, then the process moves to the block 728.

At block 728, the highest priority messages may be moved to the IPC pipeline after which the process moves to the block 730.

At block 730, it may be checked if the value of "n" has reached the value set_max. If so, then the process moves to the block 734.

At block 734, the fair share scheduler operation may be marked as complete after which the process moves to the block 736 from where it may return to the start. This may include resetting to logic low all of the group mask bits for all of the NVM sets.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

Although the embodiments disclosed herein are described with respect to solid state memory dies such as NAND, those may be applicable to other types of volatile or non-volatile memories.

The present technology is described above with reference to example embodiments. Therefore, other variations upon the example embodiments are intended to be covered by the present disclosure.

What is claimed is:

1. A controller for a solid state memory device comprising:
    a first layer non-volatile memory (NVM) set scheduler configured to receive a plurality of information messages in a plurality of queues, the plurality of queues arranged in a plurality of sets of unordered queues, each set of unordered queues being respectively associated with an NVM set, wherein the NVM set scheduler is operable to output for each of the plurality of unordered sets, an ordered queue also respectively associated with the NVM set and comprising the plurality of information messages contained in the each of the unordered sets in an order of their respective priorities in a single queue, and
    a second layer fair share scheduler configured to receive each ordered queue and further operable to generate a pipeline of the information messages from each ordered queue to be processed for input output (I/O) operations, wherein
    the second layer fair share scheduler is further operable to select in a sequential manner, one of the ordered queues, such that only a single information message from the selected ordered queue is transferred to the pipeline at a time.

2. The controller according to claim 1, wherein each ordered queue has an equal chance of being selected to transfer its information messages to the pipeline.

3. The controller according to claim 1, wherein a higher priority information message from each ordered queue is transferred to the pipeline before a lower priority information message.

4. The controller according to claim 1, wherein the information messages in each unordered set are arranged in a plurality of prioritized queues, each of the prioritized queues having a respective priority.

5. The controller according to claim 1, wherein each unordered set has an NVM set mask bit associated with it and wherein the second layer fair share scheduler is operable to check a value of the NVM set mask bit.

6. The controller according to claim 5, wherein an unordered set is selected for transferring information messages to the pipeline if the NVM set mask bit is a first logic level but not a second opposite logic level.

7. The controller according to claim 6, wherein an unordered set is not selected for transferring information messages to the pipeline if the NVM set mask bit is the second opposite logic level.

8. The controller according to claim 1, wherein each queue has a queue mask bit associated with it and wherein the first layer NVM set scheduler is operable to check the value of the queue mask bit.

9. The controller according to claim 8, wherein a queue is selected for transferring information messages to the pipeline if the queue mask bit is a first logic level but not a second opposite logic level.

10. The controller according to claim 9, wherein a queue is not selected for transferring information messages if the queue mask bit is the second opposite logic level.

11. A method of generating a pipeline of information to be processed in a solid state drive (SSD), the method comprising:
    receiving a plurality of unordered queues of information messages for a plurality of non volatile memory (NVM) sets;
    ordering the information messages into respective ordered queues for each of the NVM sets; and
    generating a pipeline of the information messages by sequentially selecting the information messages from the ordered queues,
    wherein each of the plurality of NVM sets has an equal chance of being selected for transferring its information messages to the pipeline.

12. The method of claim 11, further comprising:
    generating the ordered queues by a first layer NVM scheduler;
    receiving each ordered queue by a second layer fair share scheduler; and
    transferring only a single information message at a time from the ordered queues to the pipeline by the second layer fair share scheduler.

13. The method of claim 12, further comprising:
transferring from each ordered queue to the pipeline, a higher priority information message before a lower priority information message.

14. The method according to claim 12, further comprising:
associating an NVM set mask bit with each set, and
checking by the second layer fair share scheduler a value of the NVM set mask bit.

15. The method according to claim 14, further comprising selecting an NVM set for transferring information messages to the pipeline if the NVM set mask bit is a first logic level but not a second opposite logic level.

16. The method according to claim 15, further comprising not selecting an NVM set for transferring information messages to the pipeline if the NVM set mask bit is the second opposite logic level.

17. The method according to claim 12, further comprising:
associating a queue mask bit with each queue; and
checking by the first layer NVM set scheduler a value of the queue mask bit.

18. The method according to claim 17, further comprising selecting a queue for transferring information messages to the pipeline if the queue mask bit is a first logic level but not a second opposite logic level.

19. The method according to claim 18, further comprising not selecting a queue for transferring information messages to the pipeline if the queue mask bit is the second opposite logic level.

20. The method according to claim 11, wherein each queue has a respective priority level.

\* \* \* \* \*